United States Patent [19]
Cho et al.

[11] Patent Number: 5,927,143
[45] Date of Patent: *Jul. 27, 1999

[54] SELF-DIAGNOSTIC ACCELEROMETER WITH SYMMETRIC PROOF-MASS AND ITS PREPARATION METHOD

[75] Inventors: Young-Ho Cho; Byung Man Kwak; Kwyro Lee, all of Taejon; Kwanhum Park, Kyungsangnam-do, all of Rep. of Korea

[73] Assignees: Hyundai Motor Company, Seoul; Korea Advanced Institute of Science and Technology, Taejon, both of Rep. of Korea

[ * ] Notice: This patent is subject to a terminal disclaimer.

[21] Appl. No.: 08/907,890

[22] Filed: Aug. 11, 1997

Related U.S. Application Data

[63] Continuation of application No. 08/539,521, Oct. 6, 1995, Pat. No. 5,777,227.

[30] Foreign Application Priority Data

Oct. 7, 1994 [KR] Rep. of Korea ........................ 94-25687

[51] Int. Cl.$^6$ .................................................... G01P 15/00
[52] U.S. Cl. .................... 073/514.36; 73/514.34; 73/514.33; 73/1.39

[58] Field of Search .......................... 73/514.01, 514.33, 73/514.34, 514.35, 514.36, 522, 1.38, 1.39

[56] References Cited

U.S. PATENT DOCUMENTS

| | | | |
|---|---|---|---|
| 4,522,072 | 6/1985 | Sulouff et al. | 73/514.33 |
| 5,081,867 | 1/1992 | Yamada | 73/514.33 |
| 5,138,414 | 8/1992 | Shinohara | 73/514.34 |
| 5,186,053 | 2/1993 | Egley et al. | 73/514.36 |
| 5,239,870 | 8/1993 | Kaneko | 73/514.33 |
| 5,350,189 | 9/1994 | Tsuchitani et al. | 73/514.32 |
| 5,777,227 | 7/1998 | Cho et al. | 73/514.38 |

*Primary Examiner*—Hezron Williams
*Assistant Examiner*—Richard A. Moller

[57] ABSTRACT

A symmetrical proof-mass accelerometer with a self-diagnosis capability and its fabrication method are disclosed. The accelerometer has symmetrical mass distribution with respect to the plane of the cantilever beam with an offset between upper and lower masses, so as to minimize cross-axis sensitivity and facilitate self-diagnostic resistor installation. This accelerometer can be applied to automobile electronics systems, consumer electronics, and industrial electrical measurement systems, in which the measurements of displacement, velocity, vibration, acceleration, angular acceleration and their changes are required.

26 Claims, 5 Drawing Sheets

SELF-DIAGNOSTIC ACCELEROMETER WITH SYMMETRIC PROOF-MASS AND ITS PREPARATION METHOD

This application is a continuation of application Ser. No. 08/539,521 filed on Oct. 6, 1995, now U.S. Pat. No. 5,777,227, the entire contents of which are hereby incorporated by reference.

BACKGROUND OF THE INVENTION

1. Field of the Invention

This invention relates to a symmetrical proof-mass accelerometer with a self-diagnosis capability and a method of fabricating the same, and more particularly to an accelerometer which is designed to have a symmetrical mass distribution with respect to the plane of a cantilever beam with an offset between upper and lower mass portions, so that cross-axis sensitivity thereof is reduced and self-diagnostic resistor installation is facilitated. This invention can be applied to automobile electronics systems, as well as to consumer electronics and industrial electrical measurement systems, in which measurements of displacement, velocity, vibration, acceleration, angular acceleration and their changes are required.

2. Discussion of the Related Art

Conventional accelerometers with self-diagnosis ability and methods of fabricating the same can be classified into two types. FIG. 1(A) shows an unsymmetric proof-mass accelerometer, in which a self-diagnostic resistor or conductor is installed on a highly-stressed area for detection of the breakage of a cantilever beam.

The other type of the conventional accelerometer is a symmetrical proof-mass accelerometer as shown in FIG. 1(B). In this case, a self-diagnostic resistor or conductor extends out to the level of a mass and support.

These conventional accelerometers and their fabrication methods have problems as follows.

First, the unsymmetric accelerometer as shown in FIG. 1(A) has the problem of relatively high cross-axis sensitivity compared to that of the conventional symmetric accelerometer, because the acceleration in the unwanted direction could cause a defect in the cantilever beam. On the other hand, the conventional symmetric accelerometer as shown in FIG. 1(B) has a difficulty in installing a self-diagnostic resistor or conductor at the ends of the cantilever beam, 9a' and 9b', which are the weakest regions of the accelerometer, since the surface formed by the beam, mass and supporters are not in the same plane.

The common problem in the conventional accelerometers shown, e.g., in FIGS. 1(A) and 1(B) is that the abrupt change in thickness at each end of the cantilever beam generates stress concentration. Therefore, it may cause breakage during the fabrication process or use.

Furthermore, the conventional methods for controlling the thickness of cantilever beams in the conventional accelerometers shown in FIGS. 1(A) and 1(B) includes, such as, time-controlled etching, p-n junction forming and $p^+$ etch-stop steps. These conventional methods, however, have problems due to process instability, complexity in processing, difficultly in thickness control and limitations in material selection.

The accelerometer according to the present invention overcomes the above and other problems in the conventional methods and accelerometers. The accelerometer of the present invention has two proof-masses having an identical mass with different relative locations upon and beneath the cantilever beam, so that both self-diagnostic element accommodation and cross-axis sensitivity reduction are possible. In addition, the beam thickness control process has been simplified by an etch-thickness difference, and yield and reliability can be enhanced by using a fillet-rounding formation process. The fillet-rounding process forms a curvature at each end of the beam (the weakest region) so as to prevent breakage during or after fabrication.

SUMMARY OF THE INVENTION

An object of the invention is to provide an accelerometer and a method of fabricating the same, which provide symmetrical proof-mass distribution so as to easily accommodate a self-diagnostic element on the flat surface at each end of a beam of the accelerometer.

The accelerometer of the present invention includes a cantilever beam (2); proof-masses (1a,1b); a self diagnostic element (5) that can detect the breakage of the cantilever beam (2); and upper and lower supporting plates (13), formed in a single body. The accelerometer also has paste grooves (12a,12b) at upper and lower bonding surfaces (13a,13b) of the support (11), to which upper and lower supporting plates (10a,10b) are attached; damping gaps (3a,3b) between the proof-masses (1a,1b) and the supporting plates (10a,10b); and fillet roundings at each end (9a,9b) of the cantilever beam.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(A) and 5(B) shows examples of the skew-symmetrical accelerometer, implemented as a double-supported beam accelerometer, wherein FIG. 5(A) shows its top view and FIG. 5(B) shows its cross-sectional view.

DETAILED DESCRIPTION OF THE PREFERRED EMBODIMENTS

Figure 1A:
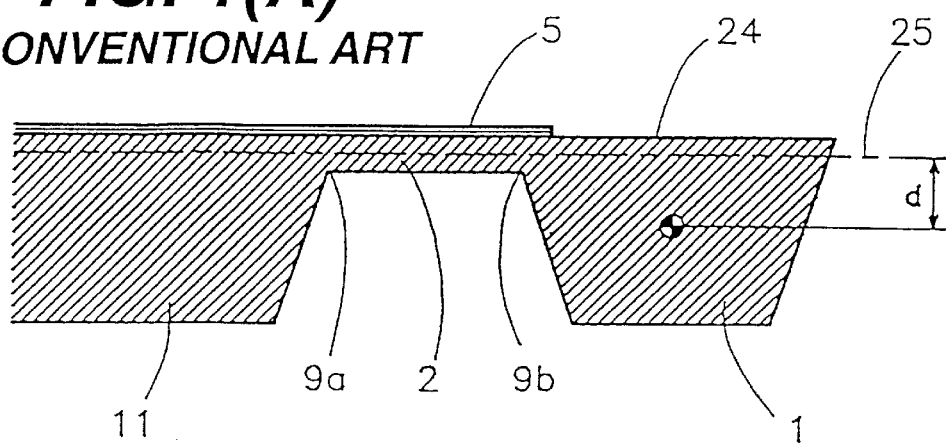
FIG. 1(A) is a cross-sectional view of a conventional accelerometer with an unsymmetrical mass.
Figure 1B:
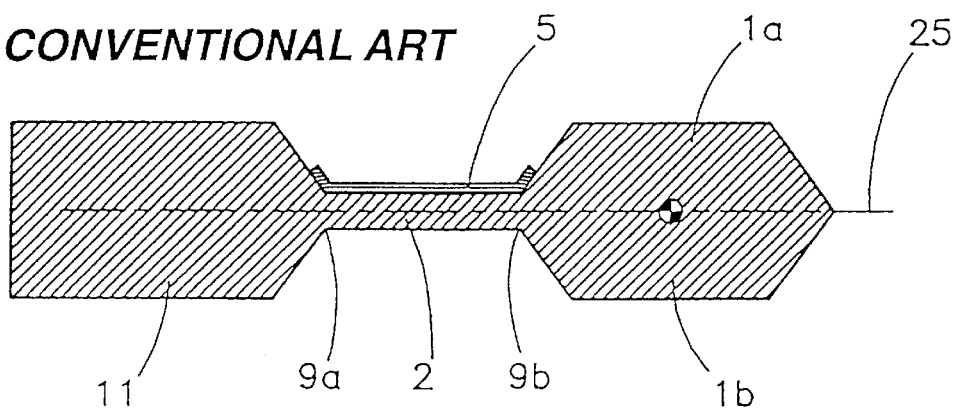
FIG. 1(B) is a cross-sectional view of a conventional accelerometer with a symmetrical mass.

The accelerometer according to the present invention can be fabricated by the following unique process steps. The steps include simultaneously etching damping gaps (15a, 15b), paste grooves (12a,12b) and beam thickness control grooves (14a,14b) as shown, e.g., in FIG. 4(B). The fabrication method also includes an etch depth control process for the formation of the damping control gaps (3a,3b) as shown in FIG. 3, a beam thickness control process using multi-step etch as shown in FIGS. 4(D) and 4(E) after the first etch of grooves (16a,16b) as shown in FIG. 4(C), a fillet rounding formation process using the first etch step as shown in FIG. 4(D) and the second etch step as shown in FIG. 4(E), a flat surface formation process for forming a space to mount self-diagnostic elements by etching an upper proof-mass (1a) and a lower proof-mass (1b) as shown in FIG. 4(E) with a horizontal offset, a simultaneous accommodation process for accommodating a piezoresistor and self-diagnostic resistor as shown in FIG. 4(F), a metalization process for the connection of piezoresistors and self-diagnostic resistor, a process for forming electrodes (6,7) and a conducting line (23) as shown in FIG. 4(G), a breakage prevention beam formation and elimination process realized through process steps as shown in FIGS. 4(E), 4(F), and 4(G) for the prevention of a breakage of a cantilever beam during fabrication steps, and a bonding process for attaching upper and lower supporting plates (10a,10b) to a support (1) with paste sealed in paste grooves (12a,12b).

Figure 1C:
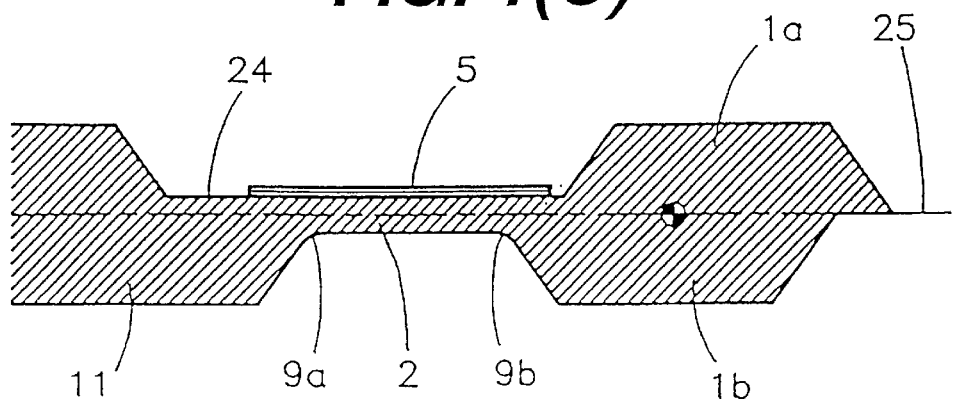
FIG. 1(C) is a cross-sectional view of an accelerometer with a skew-symmetrical mass in accordance with the embodiments of the present invention.

FIG. 1(C) shows an example of an accelerometer according to the present invention. As shown in FIG. 1(C), upper and lower proof-masses (1a,1b) are located symmetrically with respect to the center plane of a cantilever beam (2), but have an offset in their horizontal location so that the center of the total proof-mass is located on the center plane of the beam for minimizing cross-axis sensitivity as well as for providing a flat surface at the weakest regions, the ends (9a,9b) of the accelerometer, on which a self-diagnostic conductor or resistor is to be mounted. In addition, roundings are formed at both ends (9a,9b) of the beam (2), so that they prevent beam breakage caused by stress concentration.

Figure 2:
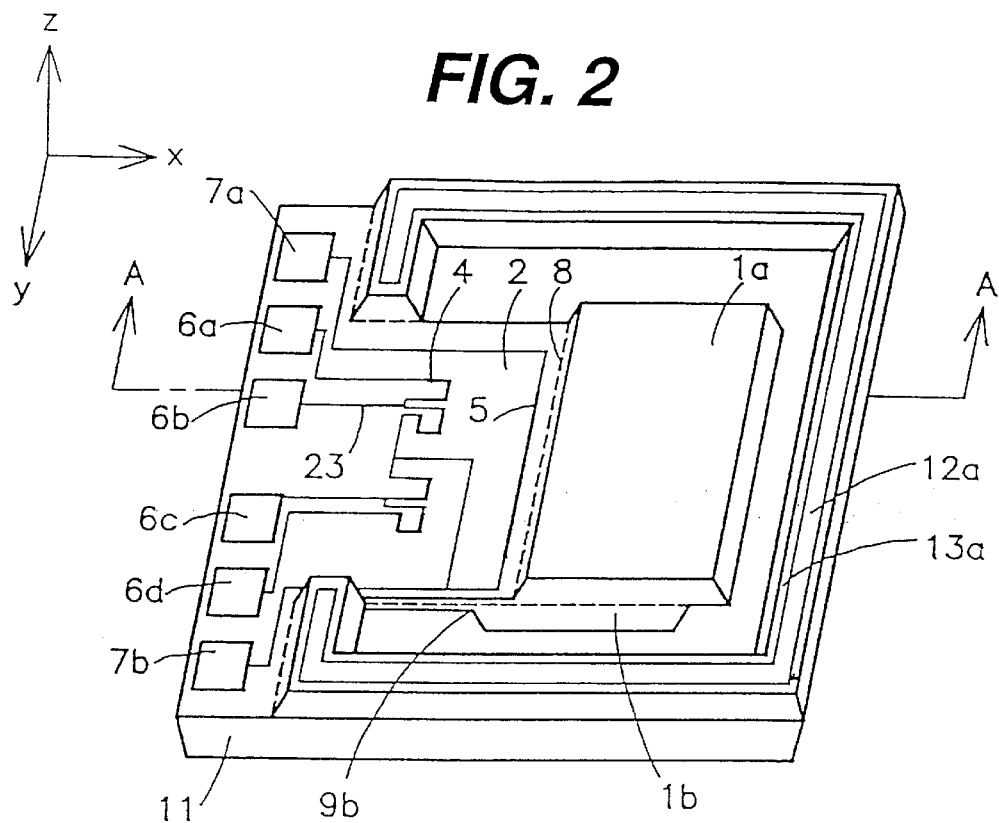
FIG. 2 is a perspective view of an example of the skew-symmetrical accelerometer shown in FIG. 1(C), implemented as a piezoresistive cantilever-beam accelerometer.
Figure 3:
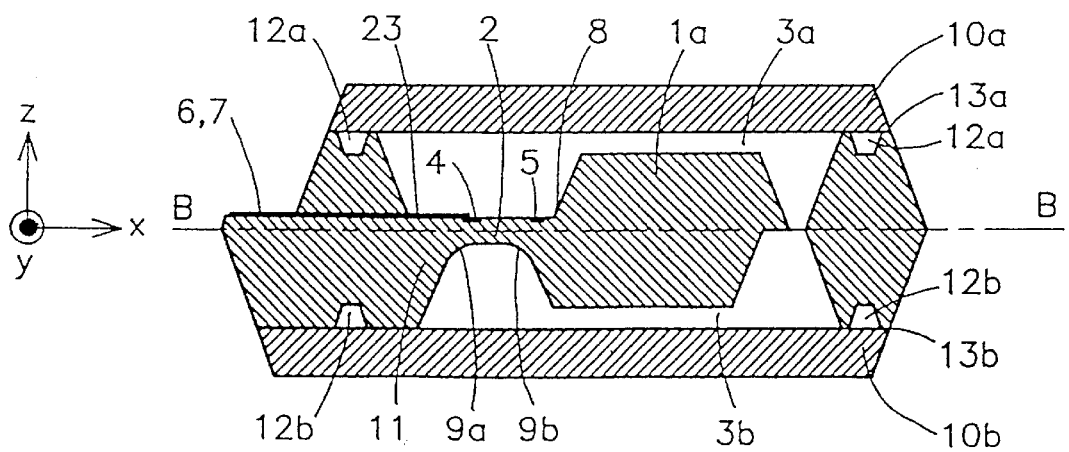
FIG. 3 is a cross-sectional view of the accelerometer along line A—A in FIG. 2, to which upper and lower plates are attached.

One example of the accelerometer, adopting the above-mentioned skew-symmetric structure, is shown in FIGS. 2 and 3.

A detailed description of the operation principle of the embodiments of the present invention is as follows.

As shown in FIG. 3, for the absolute displacement ($Z_a$) of outer supporting parts (10a,10b,11,13a,13b) and the absolute displacement ($Z_o$) of proof-masses (1a,1b), the relative displacement between the mass and the supporter can be represented as:

$$Z = Z_o - Z_a.$$

The cantilever beam (2) in FIG. 3 acts as a spring where the masses (1a,1b) and the fluid in the gaps (3a,3b) between the masses (1a,1b) and the supporting plates (10a,10b) act as a proof-mass and dampers, respectively.

Using the spring constant (K) of the beam (2), the total mass (M) of the proof mass and the damping constant of the damper (C), the equation of motion for the accelerometer can be written as follows:

$$M\ddot{z} + C(\dot{z}_o \dot{z}_a) + K(z_o - z_a) = 0 \tag{1}$$

For a sinusoidal input, $z_a = Z_a \rho^{iwt}$, the relative displacement $z = z_o - z_a = Z \rho^{i(wt-\phi)}$ can be obtained as follows, in the case of $\omega/\omega_n \ll 1$, $$z = -\frac{1}{\omega_n 2}\ddot{Z}_a \tag{2}$$

where the resonant frequency is $$\omega_n = \sqrt{\left(\frac{K}{M}\right)}$$

and damping ratio is $$\zeta = \frac{c}{2M\omega_n}.$$

Thus, from equation (2), it can be seen that the magnitude of the acceleration $M\ddot{z}_a$ can be measured from the magnitude of the relative displacement z, which is the deflection of the mass.

FIGS. 2 and 3 show an example of the implementation of the accelerometer based on the above principle with a piezoresistive detection of the deflection z from the stress at the end of the beam.

On the other hand, piezoelectric or capacitive detection type accelerometers can be implemented by replacing the piezoresistive material with a piezoelectric material or by installing electrodes on each side of the damping gap, respectively.

For these types of accelerometers, a desired resonant frequency ($\omega_n$) and damping ratio ($\zeta$) can be obtained by controlling the size of the masses (1a,1b), the beam size, the gaps (3a,3b), or the viscosity and pressure of the fluid in the gap.

As shown in FIG. 3, the proof-mass center is located on the beam plane B—B, thus eliminating the mass offset and improving the cross-axis sensitivity. The relative offset between the two identical proof-masses (1a,1b) makes it easier to install self-diagnostic elements or piezoresistors (5) on the accelerometer.

The self-diagnostic elements or piezoresistors (5) can also be used to provide the following capability to the accelerometer: a self-diagnostic capability for detecting structural breakage, a self-testing capability for detecting frequency or sensitivity of the accelerometer, and a self-calibration capability for compensating sensitivity or zero-offset with the use of counter electrodes formed on the proof-masses (1a,1b) and the plates (10a,10b).

Figure 4A:
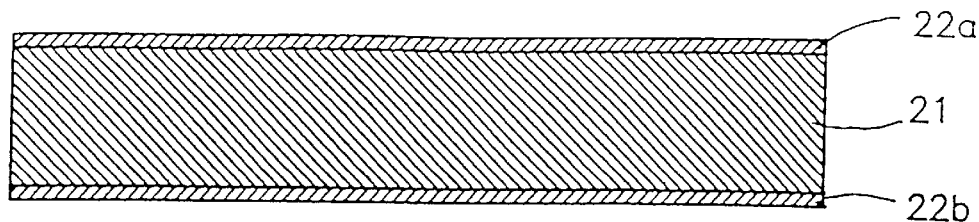
FIG. 4 is a basic fabrication process flow for the accelerometer in FIG. 2, in accordance with the embodiments of the present invention.

FIGS. 4(A)–4(G) show examples of fabrication steps for explaining a method of fabricating the accelerometer shown in FIGS. 2 and 3 by using silicon as a substrate material, according to the embodiments of the present invention. A detailed description of the method of the present invention is as follows:

As shown in FIG. 4(A), passivation films (22a,22b) are formed as etch masks on both sides of a silicon substrate (21).

Figure 4B:
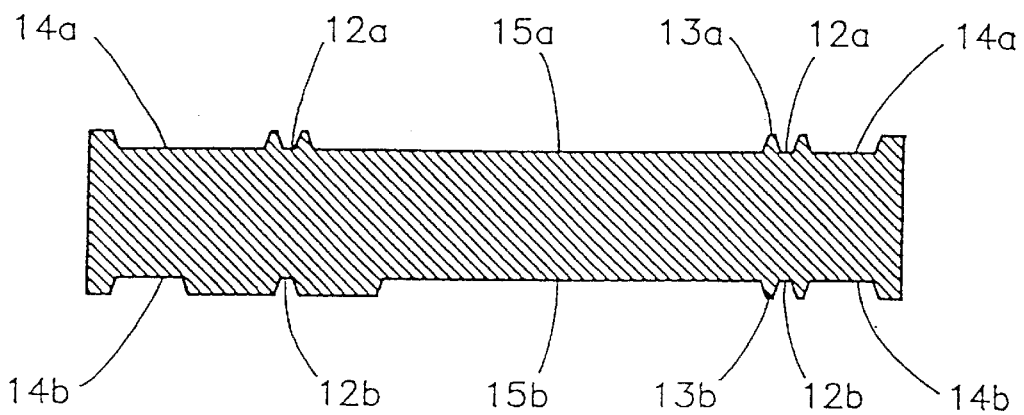
Figure 4C:
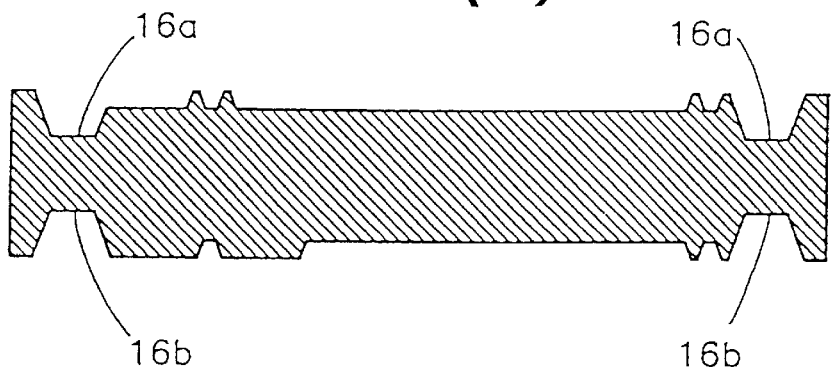
Figure 4D:
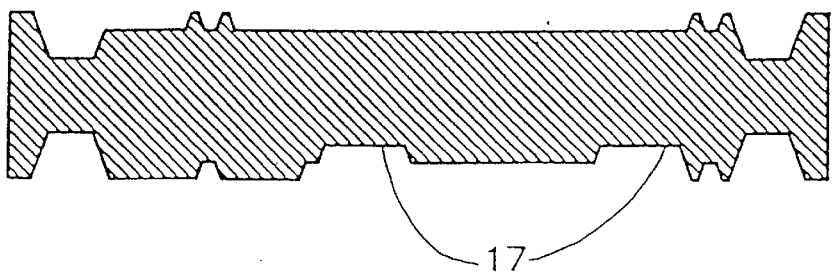
Figure 4E:
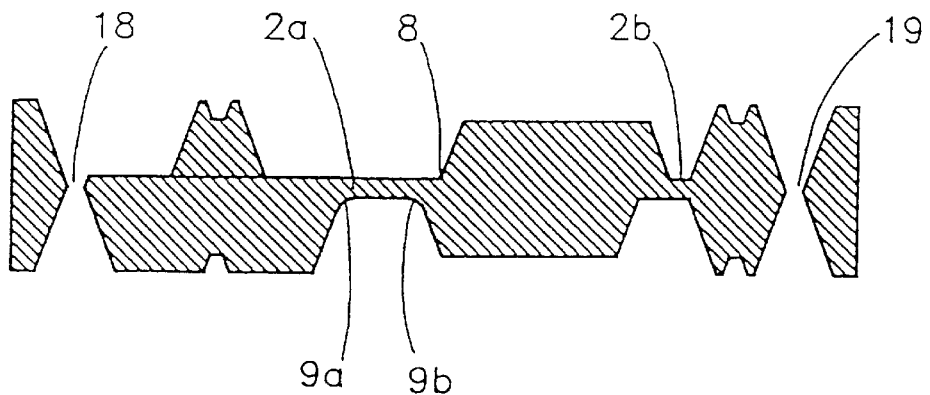
Figure 4F:
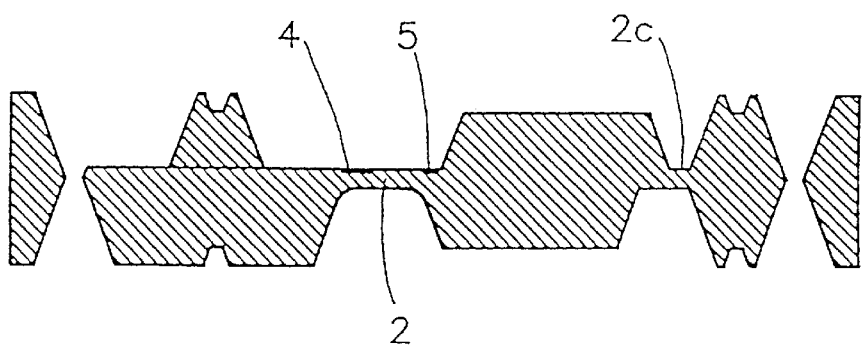
Figure 4G:
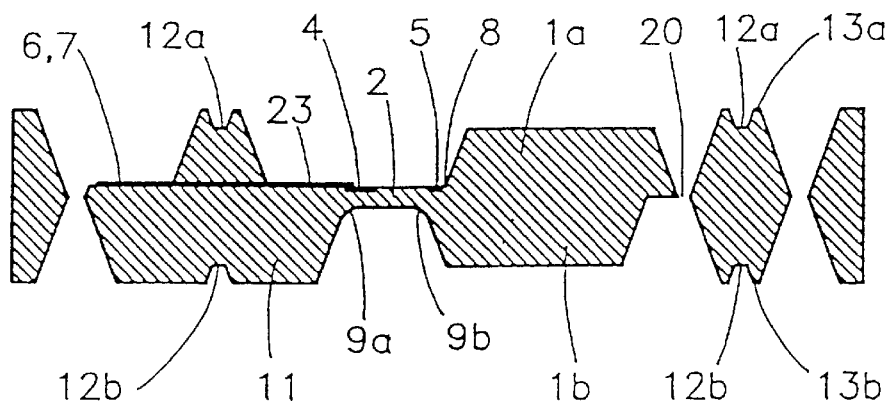
Figure 5A:
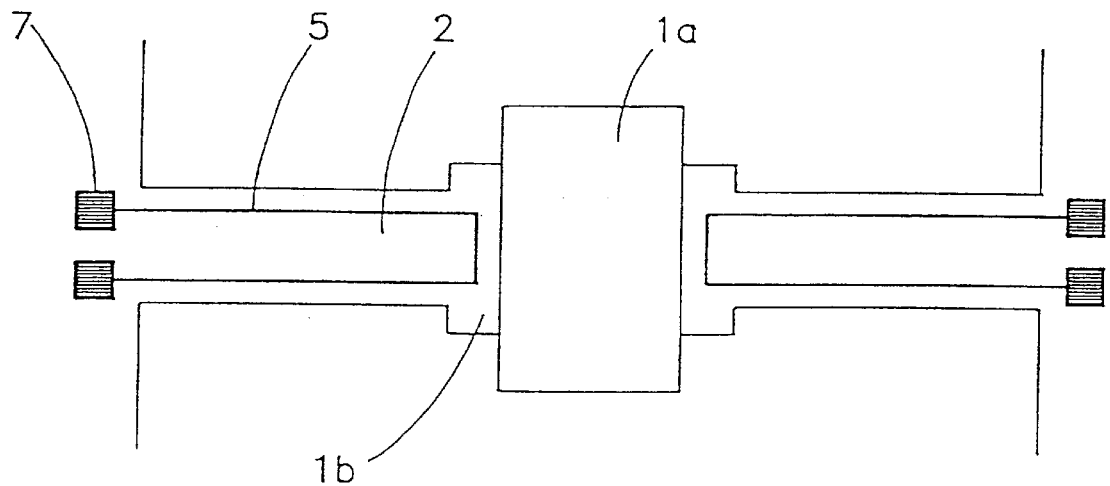
Figure 5B:
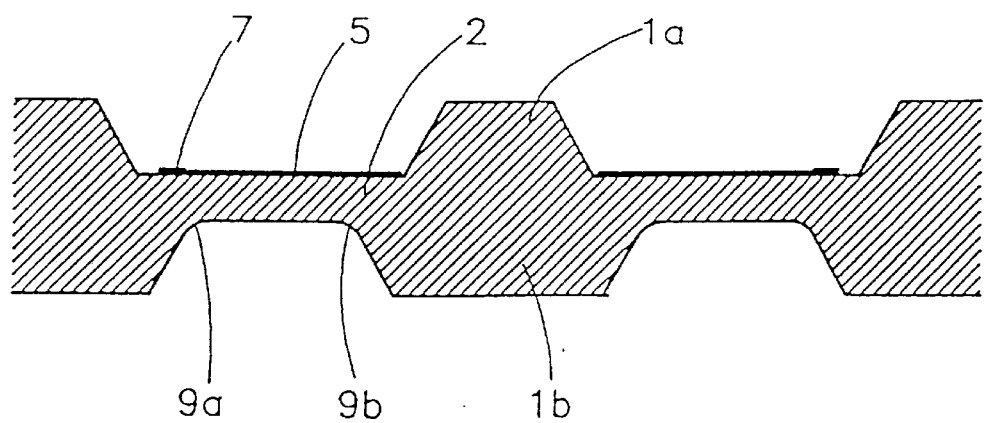

As shown in FIG. 4(B), after removing the formed passivation films (22a,22b) in certain regions, paste grooves (12a,12b), beam thickness control groove and surface for electrodes (14a,14b) and damping control gaps (15a,15b) as are formed therein. Then the unmasked silicon substrate (21) is etched to the desired depth of damping gaps (3a,3b) as shown in FIG. 3. Upper and lower bonding surfaces (13a, 13b) are prepared in this step.

As shown in FIG. 4(C), after the formation of passivation film as shown in FIG. 4(A), selected areas (16a,16b) of the passivation film and silicon substrate (21) are etched to the depth of the half of the beam (2) thickness as shown in FIG. 2, to form grooves (16a,16b) for controlling the beam thickness.

As shown in FIG. 4(D), after removing the selected area of the passivation film, the beam (2) and breakage prevention beam (17) are formed. Typically, the silicon substrate (21) is etched to the appropriate depth, e.g., 50–80 μm, for the formation of fillet rounding (9a,9b) as shown in FIG. 3. Here, the length of the opening of the beam (17) is shorter than that of the final beam.

As shown in FIG. 4(E), after removing the selected area of passivation film, the silicon substrate (21) is etched until etch-throughs (18) and (19) are wholly etched out to form a flat surface for resistor (4), conductor (23), electrodes (6a–6d,7) shown in FIG. 2 and to form the silicon membranes (2a,2b) of an identical thickness to that of the beam (2) in FIG. 3. Openings of the passivation film for upper and lower proof masses should have an identical shape and area with an offset. The length of the opening (2a) is longer than that shown in FIG. 4(D) so that it corresponds to the final beam length. As explained above for FIGS. 4(D) and 4(E), the fillet roundings with the desired shape and radius of curvature at the ends of the final beam are formed by controlling the etch length and depth of the first and second etches.

As shown in FIG. 4(F), piezoresistors (4) for the detection of the deflection of the beam are formed at the same time on the left end portion of the beam (2). Self-diagnostic resistors are also formed between the junction (8) and fillet rounding (9b) shown in FIG. 4(E).

As shown in FIG. 4(G), the electrodes 6 (6a,6b,6c,6d) for the measurement of piezoresistance, the metal line for the formation of piezoresistor bridge (23) and electrodes, and the metal line for self-diagnosis are formed, simultaneously. Then the beam (2) and the breakage preventing beam (2c) are formed by etching the selected area of silicon membranes (2a,2b) shown in FIG. 4(E). After eliminating the breakage preventing beam (2c), upper and lower supporting plates are bonded with a paste contained in paste grooves (12a,12b). The fabrication method described referring to FIGS. 4(A)–4(G) can be also used for the fabrication of double supported or multiple supported accelerometers.

Advantages of the present invention due to its structural characteristics are as follows:

1) It is possible to reduce cross-axis sensitivity as well as to simplify conductor or resistor installation process for self-diagnosis purposes by using the identical masses (1a,1b) on both sides of the beam (2) with their relative locations adjusted.
2) Based on the self-diagnostic capability described above in 1), it is possible to implement self-calibration and self-testing capability.
3) It is possible to prevent breakage of the beam during fabrication or use of the accelerometer by relaxing stress concentration with the fillet roundings formed at both ends (9a,9b) of the beam (2).
4) Damping can be controlled easily by adjusting the gaps (3a,3b) between masses (1a,1b) and supporting plates (10a,10b).
5) Paste grooves (12a,12b) formed at both sides of the support make it easier to align and attach the accelerometer to the cover plates (10a,10b).

Advantages of the present invention due to its unique fabrication methods are as follows:

1) It is possible to control damping gaps (15a,15b) more precisely and more easily by defining them at the early step of fabrication.
2) It is possible to obtain a precise beam thickness without measurement of etch time or depth before and/or during the etch process. Using the half beam etch in FIG. 4(C), etch-throughs (18) and (19) in FIG. 4(E) indicate the time for etch-stop, resulting in a precise thickness control of the beam.
3) It is possible to prevent the breakage of the beam during use by forming roundings at the weakest part of the accelerometer, i.e., at the ends (9a,9b) of the beam, using two step etch process.
4) It is possible to prevent the breakage of the beam during fabrication with the use of a breakage preventing beam (2c) formed in the middle of the fabrication, which can be removed after the fabrication process is completed.
5) The number of process steps is reduced by forming damping gaps (15a,15b) and paste grooves (12a,12b) at the same time.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A proof-mass accelerometer comprising:
a beam having a center plane therein; and
upper and lower proof-masses symmetrically located with respect to the center plane of the beam and having an offset such that the center of a total mass of said upper and lower proof-masses is located on the center plane of the beam for minimizing cross-axis sensitivity.

2. A proof-mass accelerometer of claim 1, wherein a plurality of roundings are formed at end portions of the beam so as to prevent beam breakage due to stress concentration.

3. A proof-mass accelerometer of claim 1, wherein said upper proof-mass includes a substantially flat surface for mounting electronic elements.

4. A proof-mass accelerometer of claim 3, further comprising:
piezoresistors formed on said flat surface for detecting deflection of the beam.

5. A proof-mass accelerometer of claim 3, further comprising:
self-diagnostic resistors formed on said flat surface of said upper proof-mass.

6. A proof-mass accelerometer of claim 4, further comprising:
a plurality of electrodes formed on said flat surface of said upper proof-mass for measuring piezoresistance of said piezoresistors.

7. A proof-mass accelerometer of claim 1, wherein said upper proof-mass includes first paste grooves formed thereon.

8. A proof-mass accelerometer of claim 7, wherein said lower proof-mass includes second paste grooves formed thereon.

9. A proof-mass accelerometer of claim 1, further comprising:
a first supporting plate mounted on said upper proof-mass; and
a second supporting plate for mounting said lower proof-mass thereon.

10. A proof-mass accelerometer of claim 9, wherein said first and second supporting plates attached to the upper and lower proof-masses define a plurality of damping gaps.

11. A proof-mass accelerometer of claim 1, wherein the beam provides self-testing capability, using self-diagnostic elements.

12. A proof-mass accelerometer of claim 1, further comprising:

electronic elements mounted on a flat surface of said upper proof-mass.

13. A proof-mass accelerometer of claim 12, wherein said electronic elements includes a piezoresistor and an electrode.

14. A method of forming a proof-mass accelerometer, comprising the steps of:

forming a beam having a center plane therein; and forming upper and lower proof-masses symmetrically located with respect to the center plane of the beam and having an offset such that the center of a total mass of the upper and lower proof-masses is located on the center plane of the beam.

15. A method of claim 14, further comprising the step of:

forming a plurality of roundings at end portions of the beam to prevent beam breakage.

16. A method of claim 14, wherein the step of forming upper and lower proof-masses includes the step of:

providing a substantially flat surface on the upper proof-mass for mounting electronic elements.

17. A method of claim 16, further comprising the step of:

forming piezoresistors on the flat surface for detecting a deflection of the beam.

18. A method of claim 16, further comprising the step of:

forming self-diagnostic resistors on the flat surface of the upper proof-mass.

19. A method of claim 17, further comprising the step of:

forming a plurality of electrodes on the flat surface of the upper proof-mass for measuring piezoresistance of the piezoresistors.

20. A method of claim 14, wherein the step of forming upper and lower proof-masses includes the step of:

forming first paste grooves, first beam thickness control grooves, and first damping control gaps on the upper proof-mass.

21. A method of claim 20, wherein the step of forming upper and lower proof-masses includes the step of:

forming second paste grooves, second beam thickness control grooves, and second damping control gaps on the lower proof-mass.

22. A method of claim 14, further comprising the steps of:

mounting a first supporting plate on the upper proof-mass; and mounting a second supporting plate on the lower proof-mass.

23. A method of claim 22, wherein the first and second supporting plates attached to the upper and lower proof-masses form a plurality of damping gaps.

24. A method of claim 14, wherein the beam provides self-testing capability using self-diagnostic elements.

25. A method of claim 14, further comprising the step of:

mounting electronic elements on a flat surface of the upper proof-mass.

26. A method of claim 25, wherein the step of mounting electronic elements includes the step of:

mounting a piezoresistor and an electrode on the flat surface of the upper proof-mass.

* * * * *